[11] 3,600,058

[72] Inventor Keisuke Kato
 Tokyo-to, Japan
[21] Appl. No. 855,572
[22] Filed Sept. 5, 1969
[45] Patented Aug. 17, 1971
[73] Assignee Research Institute of Technometrics Co., Ltd.
 Chiyoda-ku, Tokyo, Japan
[32] Priority Sept. 11, 1968
[33] Japan
[31] 43/64,905

[54] OPTICAL FIBER DISPLAY DEVICE
 1 Claim, 9 Drawing Figs.
[52] U.S. Cl. .................................................. 350/96 B,
 340/380
[51] Int. Cl. .................................................. G02b 5/16
[50] Field of Search ................................................ 350/96;
 340/324, 378, 380

[56] References Cited
 UNITED STATES PATENTS
 3,174,144 3/1965 O'Neill .......................... 350/96 X

| | | | |
|---|---|---|---|
| 3,210,876 | 10/1965 | Towne | 350/96 X |
| 3,252,158 | 5/1966 | Naylor | 340/380 X |
| 3,253,274 | 5/1966 | Berman | 350/96 B X |
| 3,307,175 | 2/1967 | Shill | 340/380 |
| 3,379,890 | 4/1968 | Krieter | 350/96 B X |
| 3,423,581 | 1/1969 | Baer | 350/96 B U |
| 3,467,960 | 9/1969 | Hosker | 350/96 B X |

FOREIGN PATENTS
1,092,335 11/1967 Great Britain ............... 350/96 B
 63,020 7/1968 Germany ...................... 350/96 B

*Primary Examiner*—David H. Rubin
*Attorney*—Finnegan, Henderson and Farabow

ABSTRACT: Bundles of optical fibers, in which the output ends of the optical fibers are arranged to form line segments, are grouped together so that the line segments, in combination, are capable of representing alpha-numeric symbols to be displayed. By selectively illuminating light sources adjacent the input end of the optical fiber bundles the display device can be used to display a variety of symbols.

PATENTED AUG 17 1971

INVENTOR
KEISUKE KATO

*Finnegan, Henderson & Farabow*

ATTORNEYS

INVENTOR
KEISUKE KATO

Finnegan, Henderson & Farabow
ATTORNEYS 3,600,058

OPTICAL FIBER DISPLAY DEVICE

This invention relates to optical display devices that display characters, signs, and symbols. More particularly, the invention relates to display devices which lead light from light sources to a display point through optical fibers, and are capable of displaying different symbols at different times.

There is a growing need for improved small optical display devices due to the rapid emergence of digital measuring and testing devices. While pointer-type gauges are well suited for receiving and displaying information in analog form, the growing use of digital computers and their interrelationship with measuring and testing devices has created a great need for improved small optical display devices, that are capable of displaying changes in a variable with respect to time in response to information in digital form.

Optical fiber display devices capable of displaying a plurality of images are known to provide a display of relatively high intensity and to present a cool display surface. However, these known structures for optical fiber devices have been difficult to manufacture and have not been capable of providing desirably distinct small scale displays.

One such display device uses the same number of light sources and bundles of optical fibers as the number of characters or symbols to be displayed. The input ends of the optical fiber bundles are physically distinct and each is positioned to receive light from one light source. The output ends of the optical fibers of the various bundles are intermingled with the ends of the fibers in each bundle being arranged to form a complete character or symbol. This device requires a large number of thin flexible fibers if the device is to be capable of displaying several signs or symbols. It is very difficult to arrange the output ends of the optical fibers to approximate the required shapes of the various symbols to be displayed.

Use of large diameter optical fibers in the above-described prior art device would reduce the number of fibers necessary to constitute a given display, but since thick fibers are relatively inflexible, it is usually not possible to achieve a large number of symbol shapes on the display surface because the bundles of fibers for the various symbols tend to physically overlap. Further, freedom of choice in the placement of light sources is frequently lost even if only a small number of symbols are to be displayed.

In order to avoid the fiber arrangement difficulties that are mentioned above, it has been proposed to use the output end of a large bundle of fibers as a display surface and divide the input end of the fiber bundle into a number of sub-bundles that correspond to the number of symbols to be displayed. Each sub-bundle contains optical fibers that terminate at spaced points distributed over the entire display surface. The position of the input end of an individual fiber within its sub-bundle corresponds generally to the position of the output end of the fiber on the display surface. A mask having the shape of a desired symbol is positioned between the light source and the input ends of the fibers of each sub-bundle.

It is impossible to obtain uniform brightness in each part of the various symbols using this construction. Further, most of the light from the light sources cannot be utilized because of the masks. This construction is not capable of providing high quality, uniformly bright visual displays for extremely small display devices.

The shortcomings of both of the above-described display devices become more acute as the size of the display device and the symbols to be displayed become smaller.

It is, therefore, a primary object of this invention to provide a new and improved optical display device.

Another object of the invention is to provide a display device which can easily be assembled even if the symbols to be displayed are as small as two millimeters square.

Still another object of the invention is to provide a display device that can display a plurality of symbols which will all have a uniform brightness.

Additional objects and advantages of the invention will be set forth in the description which follows, and in part will be obvious from the description, or may be learned by practice of the invention.

The invention comprises an optical display device formed by a plurality of optical fiber bundles with each of the bundles composed of a plurality of individual fibers. The optical fibers each have an input end capable of receiving light from a light source and a discharge end for forming a display surface. The fibers within each bundle are structurally joined together near the output end of the bundle. The output ends of the fibers in each bundle are arranged to form a continuous line segment, and the continuous line segments formed by each fiber bundle are arranged to form, in combination, a plurality of possible displays with the actual display at any given time being determined by the illumination of the input ends of selected fiber bundles.

Preferably, a light guide plate, such as an optical lens, is fastened to the output end of each of the fibers and connects the fibers within each of the fiber bundles.

The input ends of the fibers of each bundle can be grouped in a single compact bundle adjacent an individual light source, or can be arranged in distinct physically separated groups, with the groups within each bundle positioned adjacent different light sources. The number of possible displayed symbols can exceed the number of fiber bundles since the line segments can be used in forming more than one symbol.

The present invention provides an optical display device that is easier to construct and assemble than prior art optical fiber display devices, and is capable of providing a brighter, more uniform, and more distinct optical display than has previously been possible. The assembly advantages and the quality of the display that are possible with the present invention, are particularly important in small display devices.

The invention consists of the novel parts, constructions, arrangements, combinations, and improvements shown and described. The accompanying drawings which are incorporated in and constitute a part of this invention, illustrate certain embodiments and, together with the description, serve to explain the principles of the invention.

Figure 1:
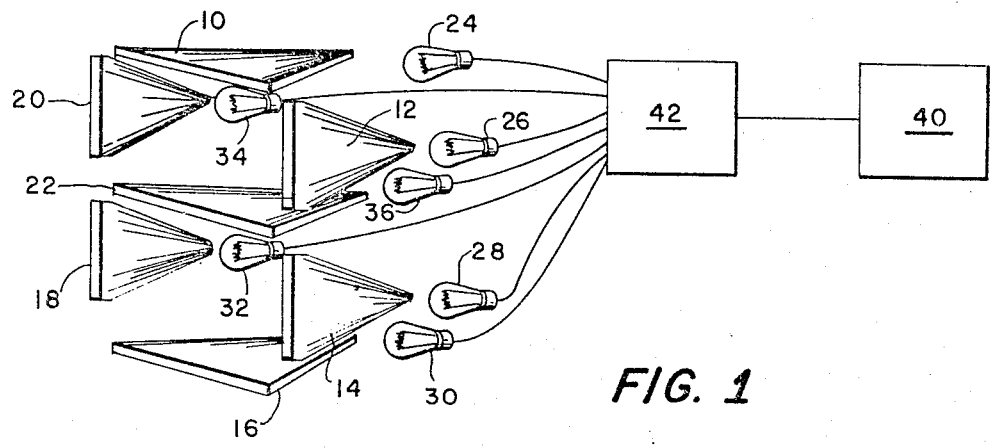
FIG. 1 is a schematic illustration of one embodiment of the optical display device of the present illustration.

The optical fiber display device shown in FIG. 1 is capable of displaying single digit Arabic numerals (0—9). The optical display device of FIG. 1 is capable of providing a visual readout of a digital signal from an input signal provided by, for example, a computer.

Seven optical fiber bundles 10, 12, 14, 16, 18, 20, and 22 are provided and seven light sources, 24, 26, 28, 30, 32, 34, and 36 are provided. Each fiber bundle includes a plurality of optical fibers made of a material such as glass or acrylic polymer that will transmit light along the length of the fibers. The input ends of the fibers within each bundle are grouped together with the input end of bundle 10 positioned adjacent light source 24. The input end of each of the bundles 12, 14, 16, 18, 20 and 22 is positioned, respectively, adjacent light source 26, 28, 30, 32, 34, and 36. The input ends of the fibers of each bundle should receive and transmit light from only the adjacent light source. If desired, opaque screens can be used to isolate the input ends of the fiber bundles from all but the adjacent light source.

The output ends of the fibers within each bundle are structurally joined to form a line segment that preferably includes a plurality of fibers making up its width dimension so that the line segment has a defined width. The line segments can be straight as illustrated, or can be curved if it is necessary to use curves in forming symbols to be displayed. Each of the seven bundles forms one line segment and the seven line segments constitute the display surface of the device. The seven line segments are arranged to form the 10 numerical display symbols without intersecting the line segments. The absence of intersecting line segments helps make the assembly procedure simpler than in prior art devices.

An input device 40 transmits a binary signal to a switching means 42 which selectively controls the illumination of the light sources. A suitable electronic matrix device is manufactured by Texas Instruments and is commercially available.

In response to the binary signal for the number "1," switching means 42 causes the illumination of light sources 26 and 28 which transmit light through fiber bundles 12 and 14 to the line segments that form the ends of these bundles. Similarly, the number "2" is displayed by illuminating light sources 24, 26, 36, 32, and 30 and thus transmitting light through fiber bundles 10, 12, 22, 18, and 16. From the foregoing, it can be seen that the seven line segments formed by the output ends of the fiber bundles are capable of forming the Arabic numerals "0 to 9."

The display device of FIG. 1 contains seven independent fiber bundles. Each fiber bundle is easy to assemble and each provides a uniformly bright output so that the line segments that form the display are uniformly bright. The resulting display is unusually sharp and easy to read even when the device is constructed in sizes as small as 2 millimeters square.

Figure 2:
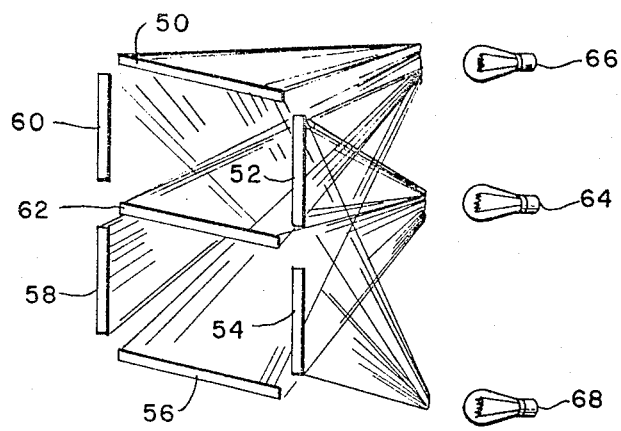
FIG. 2 is a schematic illustration of another embodiment of the optical fiber display device of the present invention.

FIG. 2 illustrates a display device constructed in accordance with the invention that can be used with a simple electrical switching means, or can easily be manually switched, since only one light source is illuminated at a given time. A complete display device for displaying single digit Arabic numerals includes seven fiber bundles 50, 52, 54, 56, 58, 60 and 62, and would include ten light sources corresponding to the numbers "0 to 9". In FIG. 2 only three light sources, 64, 66, and 68 are illustrated with the other light sources being omitted for clarity in reading the drawing. Light sources 64, 66, and 68 are used in forming the numbers "1," "2," and "7" respectively as described more fully below.

Each of the fiber bundles 50, 52, 54, 56, 58, 60 and 62 includes a plurality of optical fibers that are structurally joined at their output end to form continuous line segments. The input ends of these fibers in each bundle are arranged in distinct physically separated groups with each group positioned adjacent a light source, and with the input ends of the fibers in the group receiving light from only the adjacent light source.

As illustrated in FIG. 2, the number "1" is formed by fiber bundles 52 and 54 so the input ends of a group of fibers in bundle 52 and the input ends of a group of fibers in bundle 54 are positioned to be illuminated by light source 64. Similarly, since the number "2" is formed by the output end of bundles 50, 52, 62, 58, and 56, the input end of a group of fibers in each of these bundles is positioned to receive illumination from light source 66. The number "7" is formed by the output end of bundles 50, 52, and 54 and the input end of a group of fibers in each of these bundles is positioned to be illuminated by light source 68.

The display device of FIG. 2 is slightly more complicated to assemble because of the need to divide the input ends of the fibers in a bundle into groups. However, the device of FIG. 2 does not require a complicated switching means such as a matrix device.

It should be noted that the output end of the fiber bundles forms the display surface in both embodiments. Each line segment of the display is made of the output ends of fibers structurally joined together to form a long, thin, rectangular surface. Assembly of the display device is quite simple since only seven fiber bundles are required.

Figure 3:
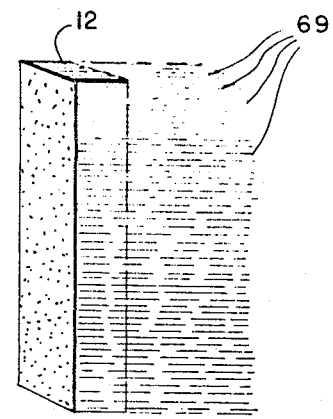
FIG. 3 is an enlarged perspective view of the output end of one of the fiber bundles of FIG. 1.

As illustrated in FIG. 3, the output end of fiber bundle 12 is formed by joining the output ends of individual fibers 69 together by an adhesive.

Figure 4:
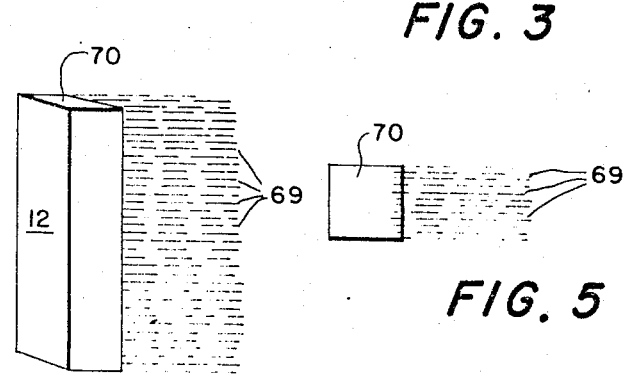
FIG. 4 is a perspective view of the output end of a fiber bundle constructed in accordance with one embodiment of the invention.
Figure 5:
FIG. 5 is a plan view of the output end of the fiber bundle illustrated in FIG. 4.

In another embodiment of the invention, as illustrated in FIGS. 4 and 5, the ends of the fibers 69 in a bundle are inserted into openings in one side of a light guide 70, made of translucent or transparent glass or plastic. This construction for the output end of the fiber bundles is preferred because light transmitted along the fibers 69 can be evenly distributed at the output surface of light guide 70.

The concentration of the light emitted from the output ends of optical fibers can be varied. The light will be highly scattered if the output ends have a rough surface, or can be a narrow, intense beam if the output surface is highly polished. The latter phenomena is due to the fact that optical fibers will internally reflect all light striking the interface of the output end and another medium at more than a certain critical angle.

Figure 6:
FIG. 6 is a plan view of a light guide plate in the form of an optical lens.

An optical lens 72, as illustrated in FIG. 6, can be used to produce parallel output beams of light from the display device. It is desirable to obtain parallel beams of light when making graphic copies of the displays, for example, by exposing light sensitive paper to the display device.

Figure 7:
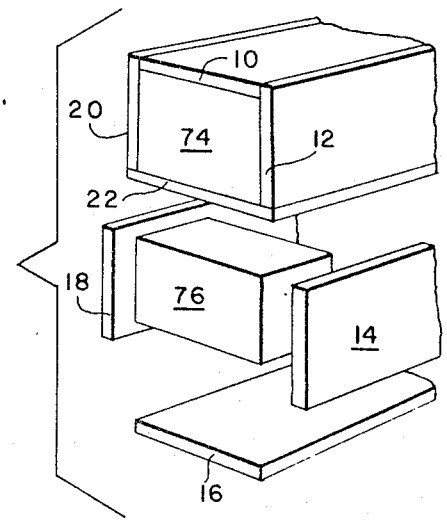
FIG. 7 is a perspective view of a means for assembling the display device of FIG. 1.

To assemble the individual fiber bundles to form the composite display device, it is convenient to adhere the fiber bundles on the side surface of glass or plastic blocks which have the shape of the blank or open parts of the symbols to be displayed. Thus, with reference to FIG. 7, the device of FIG. 1 can be assembled by adhering bundles 10, 12, 20 and 22 on the side of a rectangular solid 74 and fiber bundles 14, 16 and 18 are adhered on the side surfaces of another rectangular solid 76. Subsequently, fiber bundle 22 is adhered to the top surface of rectangular solid 76 to complete the assembly.

Figure 8:
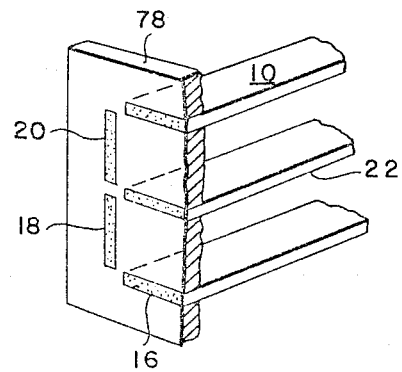
FIGS. 8 and 9 are fragmented, perspective views of display surfaces constructed in accordance with the present invention.

Another method of assembly of one embodiment of the display device of this invention is illustrated in FIG. 8. Holes are cut through plate 78 as illustrated in FIG. 8 and the fiber bundles are inserted through the holes and positioned with their output ends parallel to the front face of plate 78.

Figure 9:
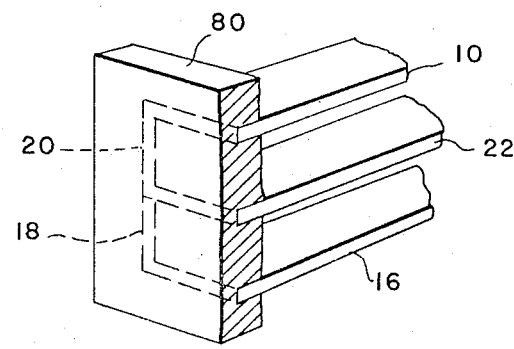

In another embodiment of the invention illustrated in FIG. 9, slots are cut in one face of a rigid translucent or transparent plate 80 and the ends of the fiber bundles are inserted into these slots. In this embodiment the plate 80 functions as both a light guide and a means for facilitating assembly. The surfaces formed by the output end of the fiber bundles and the surface of the slots can be chosen to provide a lens effect.

In summary the invention provides an optical display device in which bundles of optical fibers are arranged with the output end of each bundle forming a line segment, and the line segments arranged to form a plurality of possible display symbols which each incorporate one or more of the line segments.

The invention permits easy assembly of very small characters and signs of a few millimeters square, permits the use of the same display parts for different light source control systems, and provides bright displays, since no masks are required at the input end of the device.

The invention in its broader aspects is not limited to the specific details shown and described. Departures can be made from these details without departing from the principles of the invention and without sacrificing its chief advantages. For example, the invention can be used to display various combinations of alpha-numeric symbols since the number of and arrangement of the line segments formed by the fiber bundles can be varied.

I claim:

1. An improved optical display device comprising: a plurality of light sources; a plurality of optical fiber bundles, each of said bundles including a plurality of individual optical fibers, said fibers each having an input end positioned adjacent a light source for receiving light from the adjacent light source at all times that said light source is illuminated, and an output end for emitting light, with the output ends of the fibers in each bundle arranged to form a continuous line segment, each of said bundles further including a light guide plate holding together the output ends of the fibers within the fiber bundle and evenly distributing light from the output ends of said fibers within the bundle, said light guide plate having the shape of the line segment formed by the ends of the fibers said light guide plate holds, and having openings in only one side of said light guide plate with the ends of said fibers inserted into said openings and terminating in contact with said light guide plate; and the light guide plates being arranged to form in combination a plurality of possible displays with the actual display at any given time being determined by the illumination of the input ends of selected fiber bundles, said optical display device including seven fiber bundles each terminating in a rectilinear light guide plate and further including a pair of spaced vertically aligned rectangular block members, said light guide plates positioned to extend parallel to the top, bottom and sidewall surfaces of said rectangular block members and fastened thereto, with the front face of each of said light guide plates terminating in the plane of the front face of said rectangular block members and with a single one of said light guide plates occupying the space between said block members.